United States Patent [19]

Eikelberger

[11] 4,175,646
[45] Nov. 27, 1979

[54] ELECTRIC PARKING BRAKE

[76] Inventor: Bruce H. Eikelberger, 2396 California Ave., Long Beach, Calif. 90806

[21] Appl. No.: 902,348

[22] Filed: May 3, 1978

[51] Int. Cl.$^2$ ............................................. F16D 65/36
[52] U.S. Cl. ..................................... 188/156; 188/162
[58] Field of Search ................ 188/2 R, 3 R, 18 A, 188/71.1, 72.4, 156, 162

[56] References Cited

U.S. PATENT DOCUMENTS

| 2,251,521 | 8/1941 | McIntyre et al. | 188/162 |
| 2,403,870 | 7/1946 | Martin | 188/162 X |
| 2,672,223 | 3/1954 | Butler | 188/72.4 X |
| 2,734,590 | 2/1956 | Hays | 188/2 R X |
| 2,933,159 | 4/1960 | Steibinger | 188/162 X |
| 3,204,725 | 9/1965 | McGraw | 188/156 X |
| 3,915,260 | 10/1975 | Kim | 188/2 R |

Primary Examiner—Duane A. Reger

Attorney, Agent, or Firm—Fulwider, Patton, Rieber, Lee & Utecht

[57] ABSTRACT

A hydraulic parking brake with an electric actuator is provided for an automotive vehicle and is adapted for use with a hydraulic brake system in the vehicle. A manually operated switch engages an electric motor which drives a ram to increase hydraulic pressure to force the caliper pads or brake shoes of a brake into engagement with a brake disk or drum. The electric motor is equipped with associated limit switches, which disengage the motor following operation to prescribed limits. A torsion spring is part of the mechanism that activates the hydraulic master cylinder. This spring holds hydraulic pressure within a range of pressure values adequate to hold the brake and still avoid damage to the brake components. This ensures that the electric motor can travel far enough to activate the limit switches.

7 Claims, 6 Drawing Figures

U.S. Patent  Nov. 27, 1979  4,175,646
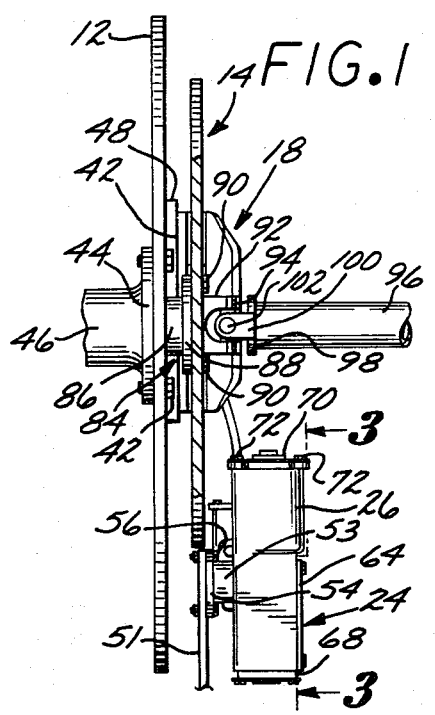
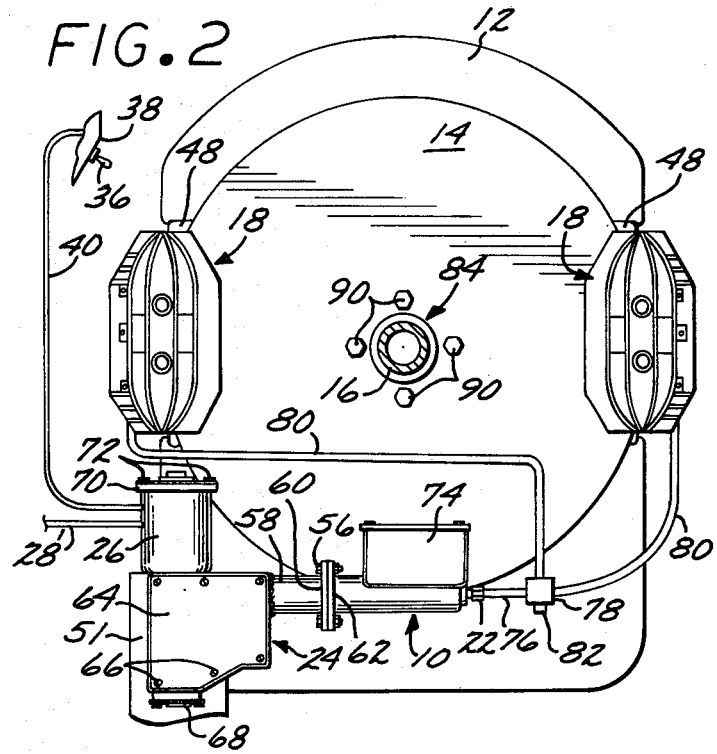
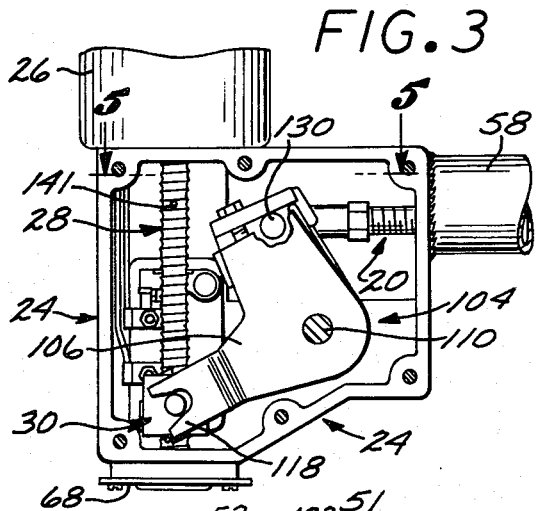
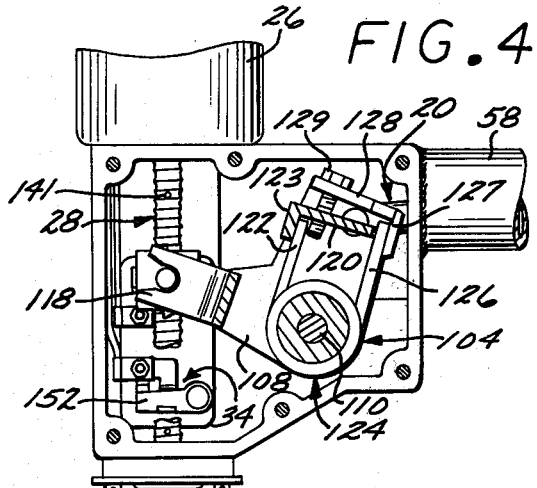
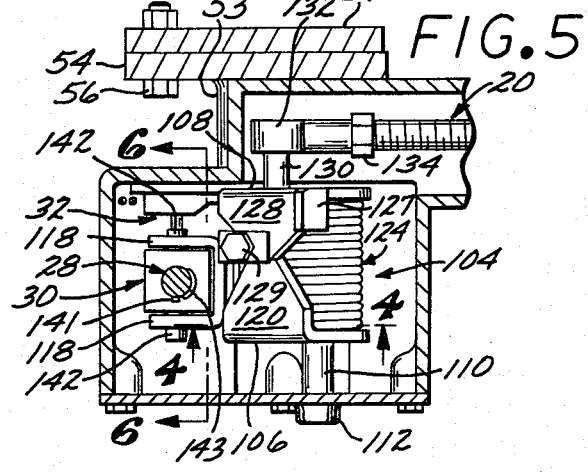
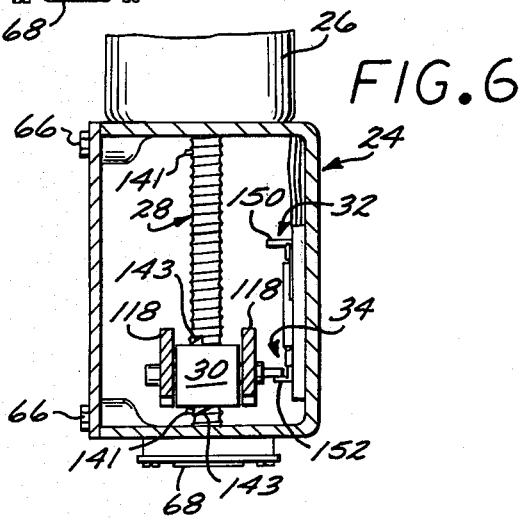

ELECTRIC PARKING BRAKE

BACKGROUND OF THE INVENTION

1. Field of the Invention

The present invention relates to vehicle parking brakes for vehicles equipped with hydraulic brake systems, and especially heavy vehicles, such as trucks and the like.

2. Description of the Prior Art

In the past, most vehicles, such as automotive vehicles, have been equipped with parking brake systems. However, conventional parking brakes are invariably mechanically operated devices. A typical automotive vehicle parking brake employs a lever in the vehicle cab or other operator area which draws on a cable to pull conventional disk brake pads or drum brake shoes into frictional engagement with a disk or drum associated with each of the rear wheels of a vehicle or with a special dedicated parking brake located at the vehicle transmission. The lever is manually operated, either by hand or by foot. In this mechanical system a pawl is disposed to allow actuation of the lever when physical force is applied to engage the brake, but the pawl engages a rack to prevent reverse movement. The force on the brake pads or shoes is directly proportional to the physical force applied to the lever. A latch must be manually withdrawn to release the pawl when it is desired to disengage the brake.

In alternative systems, hydraulic pressure is used. Again, a hand or foot lever is physically operated to exert hydraulic pressure on the brake pads or shoes to lock the parking brake. Once the hydraulic pressure is applied, a hydraulic valve is closed to lock the pressure onto the service brakes. The valve may be manually actuated, or it may be actuated remotely through a switch which controls an electric solenoid to close the valve.

The conventional parking brake systems employed with vehicles have been deficient in operation in several respects. This particularly true with respect to heavy vehicles, such as beverage trucks. Because of the large weight involved, the strength required to engage the manually actuable mechanical parking brake levers is quite large. Very frequently through operator inattention or lack of the requisite manual strength, the mechanical parking brakes conventionally employed are not completely engaged because insufficient force is applied to the brake lever. As a result, there are presently numerous instances of runaway vehicles that result from parking brake failure. These occurrences are especially prevalent where beverage trucks, or other heavy vehicles are parked on inclines. The problem is particularly acute with beverage trucks, since these vehicles are usually utilized to make frequent stops and the parking brakes employed therewith are very frequently engaged and disengaged throughout the course of a delivery run.

Another disadvantage of the conventional mechanical parking brake systems is that they are rated and specified for use with vehicles, the weights of which are calculated in an unloaded condition by the responsible regulatory authorities. During actual use, however, the loaded weight of the vehicle is double or even more than twice as great as its empty weight. Also, regulations typically require parking brakes to hold a vehicle on a 20% grade. In actual use, however, vehicles are frequently required to traverse grades of 30 to 35%, particularly in mountainous or hilly areas. As a consequence, although, a vehicle weight any dictate the requirement for a mechanical parking brake rated for example, as requiring 90 lbs. of input pressure for actuation, such a brake has inadequate holding power in actual use.

SUMMARY OF THE INVENTION

The present invention overcomes the deficiencies of the prior art by providing a parking brake system which can be manually activated merely by the flick of a switch. Activation of the switch engages an electric motor driven from the vehicle electrical power supply, either from the vehicle alternator or generator or the vehicle electrical storage battery, which are invariably provided with all automotive vehicles. Actuation of the motor drives a ram to compress the hydraulic fluid in a hydraulic cylinder associated with a hydraulic parking brake system. The motor is driven until a traveler strikes a limit switch, which disengages the motor by breaking the power supply circuit thereto. Typically especially in heavy automotive vehicles, a hydraulic parking brake separate from the wheel brakes is employed. Often this parking brake is interposed between the transmission and the vehicle drive shaft at the rear of the transmission housing. The present invention is designed for use with a parking brake system independent of the vehicle service brake system. It is inappropriate for use with the service brake system of vehicles with which it is employed. This is because the amount of fluid required to actuate a service brake system is much greater than is used for the parking brake system of the present invention. Accordingly, a system according to the present invention contemplates the use of an existing extension housing on a transmission. However the conventional parking brake drum that would normally appear at this extension housing is replaced with a brake disk and caliper system, although either a drum or disk brake system can be employed as the locking element.

In actuation of the parking brake, movement of the ram of the invention by the electric motor achieves a predetermined pressure through the use of a torsion spring to frictionally engage the disk brake pads or drum shoes with the wheel disk or drum. Once actuated, the motor may be disengaged by a limit switch. Disengagement of the parking brake is achieved as easily as engagement. That is, the manually operated electrical switch is reversed so that the electric motor is driven in the opposite direction. This withdraws the ram from the hydraulic parking brake cylinder, thereby releasing pressure on the brake pads or shoes. Withdrawal of the ram is accompanied by actuation of another limit switch by the motor to disengage the motor from the system, thereby terminating the drain of electrical current from the vehicle storage battery following parking brake disengagement.

It has been found highly desirable for a pressure variation compensation device to be provided in association with the parking brake of the invention. The pressure compensation mechanism is interposed between the electric motor and the ram directed toward the parking brake cylinder for the purpose of compensating for variations of hydraulic pressure that may occur. Such pressure variations result from small leaks of hydraulic fluid and from cooling of the hydraulic fluid and brake parts. Upon cooling the brake parts and hydraulic fluid contract, thereby resulting in a decrease in hydraulic pressure. Such instances occur during prolonged stops and in situations where the vehicle is parked overnight. Conversely, if the vehicle is parked with the brakes relatively cool and with the parking brake of the invention engaged, and left in the sun and heated during the course of the day, the pressure compensation mechanism does not unduly stress the hydraulic lines, but rather serves to relieve excessive pressure that is built up by thermal expansion of the hydraulic fluid. No corresponding pressure variation compensation device currently exists in prior art parking brake systems.

One suitable pressure compensation device is a shifter mechanism conventionally used for a two speed axle. This pressure compensation device, or accumulator, employs a pair of hinged or rotatably connected crank arms which are interconnected together by a coil torsion spring. One end of the coil spring is driven from by one of the crank arms, sometimes termed the outboard or primary crank arm. Force is transmitted through the spring to act on the other or secondary crank arm. In conventional use, the secondary crank arm operates a gear change mechanism in a two speed axle. When used according to the present invention, however, the secondary crank arm drives the ram toward the parking brake cylinder until the hydraulic fluid exerts force predetermined by the value and preload of the torsion spring.

While the torsion spring with which a shifter mechanism is commercially manufactured is adequate for the intended use of the manufacturer, the spring may require replacement for the device to be used according to the present invention. Typically, a shifter is supplied with a spring which will apply only about 20%-25% of the necessary input force required to apply adequate hydraulic pressure. The requirement for the spring will vary according to the hydraulic components employed.

The pressure compensation device is required for use according to the present invention to maintain an adequate hydraulic pressure to ensure that the parking brake holds, and to limit hydraulic pressure to prevent damage to the parking brake components. This ensures that the electric motor can travel far enough to activate the limit switches so that the motor will not burn out.

Heating or cooling of the hydraulic fluid and brake parts will, of course, tend to alter the opposing force of the brake fluid. However, the hydraulic fluid pressure is maintained constant since any incremental reduction in fluid pressure will allow the torsion spring to drive the ram deeper into the brake cylinder to maintain adequate hydraulic pressure. By the same token, any increase in hydraulic fluid pressure will force the ram further out of the cylinder.

The invention may be described with greater clarity and particularity by reference to the accompanying drawings.

DESCRIPTION OF THE DRAWINGS

FIG. 1 is a side elevational view of a parking brake according to the present invention.

FIG. 2 is a front elevational view of the parking brake of FIG. 1, diagramatically showing the electrical connections thereto.

FIG. 3 is a front elevational view of a detail taken along the lines 3—3 of FIG. 1, showing the parking brake disengaged.

FIG. 4 is a front sectional detail view corresponding to that of FIG. 3, showing the parking brake engaged.

FIG. 5 is a sectional plan view taken along the lines 5—5 of FIG. 3.

FIG. 6 is a sectional elevational view taken along the lines 6—6 of FIG. 5.

DESCRIPTION OF THE EMBODIMENT

With reference in particular to FIG. 2, the invention as illustrated as a parking brake mechanism for a vehicle, such as a beverage truck, having manual operating controls and equipped with a hydraulic parking brake cylinder system, including a hollow horizontally disposed hydraulic parking brake cylinder 10 immobilized relative to the frame of the vehicle by attachment to a vertical steel mounting bracket 51 attached to the structural framework of the vehicle. A thin steel disk 14 is mounted to rotate with the vehicle drive shaft 16 relative to a laminar vertical steel mounting plate 12. The disk 14 may be immobilized by hydraulic actuation of the calipers 18 which are mounted on either side of the rotatable disk 14 and are secured to the vertical mounting plate 12. The calipers 18 are each of generally U-shaped cross-sectional configuration and include opposing brake pads which face each other and between which the disk 14 may be rotated as illustrated in FIG. 1. When the calipers 18 are hydraulically actuated, the pads are forced inwardly to clamp the disk 14 and immobilize it.

Mounted atop the hydraulic cylinder 10 is a hydraulic fluid reservoir 74 which contains excess hydraulic fluid. The restricted outlet port 22 at the right hand extremity of the hydraulic cylinder 10 is connected by inverted seat aircraft type fittings to a flexible brakeline 76 which accomodates vibration between the hydraulic cylinder 10 and the calipers 18. The flexible hydraulic brakeline 76 is connected to a junction block 78 to provide dual paths of fluid communication to rigid steel brakelines 80 which extend to each of the calipers 18. A port in the lower portion of the junction block 78, shown capped by a plug 82 in FIG. 2, is available for use for connection to a hydraulic pressure measurement gauge. This connection may be used in testing or for connection to a visual indicator on the dashboard 38 to signal the existence of a sufficient pressure to indicate engagement of the brake pads of the calipers 18 with the rotatable disk 14.

The calipers 18, are of the type conventionally used with disk brakes of automotive vehicles. That is, the U-shaped arms of each of the calipers 18 extend radially inwardly a short distance toward the center of the disk 14 at the perimeter and on the opposite sides thereof. Within these arms are located brake pads which when actuated, exert a compressive force from either side of the disk 14 to create friction to prevent rotation of the disk 14 therebetween. The disk pads are otherwise spring biased outwardly away from the sides of the disk 14 by springs (not shown) within the calipers 18. However, when hydraulic fluid is forced through the steel brakelines 80, the hydraulic force therefrom acts through brake cylinders to overcome the internal spring bias and to force the brake pads toward each other and against the opposite flat surfaces of the rotatable disk 14. When hydraulic pressure is applied to the brakelines 80, the calipers 18 lock the disk 14 rigidly immobile. When hydraulic pressure in the brake lines 80 is relieved, the spring bias within the calipers 18 forces the brake pads therein outwardly in opposite directions away from the surface of the disk 14, so that it is possible for the drive shaft 16 to rotate the disk 14.

A rotor casting 84 is visible in FIG. 1, and includes a horizontally disposed stub axle 86 extending to the left for engagement with a driving gear within the transmission housing, and an integral annular flange 88 to which the rotatable disk 14 is connected by means of bolts 90. The rotor 84 is a cast structure and also includes a yoke 92 that extends through a central aperture in the disk 14 and which includes opposing outwardly extending arms which carry a standard universal journal and bearing assembly. This includes a cross-shaped drive member 94. The drive shaft 96 terminates in a tube yoke 98 from which arms 100 protrude. The arms 100 are pivotally connected to the drive member 94 by cross pin 102, which passes through the drive member 94 and is carried by the arms 100.

When the vehicle is in motion, the transmission turns the stub axle 86 of the rotor 84, which in turn carries the flange 88, the disk 14 and the yoke 92. The yoke 92 in turn carries the cross-shaped drive member 94 in rotation to rotate the drive shaft 96 by means of the cross-pin 102 and connecting arms 100. When the calipers 18 are actuated, however, the disk 14 is locked immobile relative to the vehicle frame. By reason of the rigid connection of the bolts 90 to the flange 88 and by connection of the stub axle 86 to the vehicle transmission, the drive shaft 96 is likewise immobilized from rotation.

The parking brake system also includes a horizontally disposed cylindrical ram 20 directed into the hollow brake cylinder 10 and partially visible in FIGS. 3 and 5. When actuated to engage the parking brake, the ram 20 is forced to the right, as viewed in FIG. 4, and is driven into the cavity defined within the hollow brake cylinder 10 to shorten the dimension of the interior fluid occupied cavity therein and to force hydraulic brake fluid through a restricted opening 22 into a brake line system to actuate the calipers 18.

An irregular shaped hollow housing 24 is connected to the brake cylinder 10 at the extreme left hand extremity of the brake cylinder 10, and is mounted upon a bracket 51 attached to the vehicle frame. The extreme left hand extremity of the ram 20 extends into the housing 24, as illustrated in FIGS. 3 through 5. The irregular shaped housing 24 is formed with a casting that includes a boxlike cavity, a downwardly extending opening across which a bearing mount 68 is fastened, a laterally extending tubular sleeve 58 with a flange ring 60, and a rearwardly extending sleeve 53 terminating in a flange 54.

An electric motor 26 is confined within a cylindrical metal canister which is mounted atop the irregular shaped housing 24. The motor canister of the motor 26 may be welded to the top of the irregular shaped housing 24, or bolted thereto. A disk shaped cover 70 is fastened to the canister of the motor 26 by means of bolts 72, as depicted in FIGS. 1 and 2. An electrical cable 28' extends from the motor canister carrying wires for connection with the limit switches 32 and 34 located in the housing 24, and to the vehicle electrical power supply, preferably through a fused connection to further safeguard the motor. Likewise, electrical leads within the cable 40 contain series connections to a toggle switch 36 to establish an electrical path to initiate operation of the motor 26.

The motor 26 is a d.c. motor, and may be driven in either direction of rotation to reversibly drive the ram 20. Depending from the lower extremity of the motor 26, is worm-toothed vertically oriented motor shaft 28 depicted in FIGS. 3 through 6. The worm shaft 28 carries a vertically movable rectangular traveler block 30 which may be driven up and down the worm shaft 28 by rotation of the armature of the motor 26 in opposite directions. A cylindrical transversely extending catch pin extends out of one side of the traveler block 30. Knife type limit switches 32 and 34, depicted clearly in FIG. 6, define a range of cyclical operation of the motor 26. Actuation of either of the limit switches, breaks the electrical circuit for providing power to the motor 26 in one of the two directions of rotation of the motor 26.

A declutching device is included in the form of a roll pin 141 extending through the worm shaft 28 near the upper and lower extremities thereof, and tabs 143 at both the top and bottom of the traveler block 30. Once the traveler block 30 approaches either roll pin, the approaching tab 143 engages a roll pin 141 to activate an internal disengaging mechanism within the traveler block 30. The traveler block 30 then freewheels harmlessly, so that the motor 26 is never brought to an abrupt stop.

A single pole, double throw actuating toggle switch 36, depicted in FIG. 2, is located in the vicinity of the manual operating controls of the vehicle. As depicted in FIG. 2, the toggle switch 36 is located at the underside of the dashboard panel 38 in the truck cab. An electrical connection cable 40 extends from the toggle switch 36 to the motor 26. The toggle switch 36 is used to initiate movement of the motor 26 to alternatively propel the ram 20 toward the right and into the hydraulic cylinder 10 for parking brake engagement, as depicted in FIG. 4, or toward the left hand and out of the hydraulic cylinder 10 for parking brake disengagement, as depicted in FIG. 3.

The vertical steel mounting plate 12 is approximately three-eights (⅜) inches in thickness, and as indicated in FIG. 1, is secured by bolts 42 to the outwardly extending circular flange 44 at the cylindrical end 46 of the transmission housing of a vehicle, such as a beverage truck. The holes through the mounting plate 12 are reamed to allow the bolts 42 to pass therethrough, while the holes in the flange 44 are tapped to receive the bolts 42 in threaded engagement.

On either side of the disk 14, as depicted in FIG. 2, steel attachment plates 48 for the calipers 18 are welded to the mounting plate 12 to reinforce the backing provided for attachment of the calipers 18. Three-eights (⅜) inch bolts fasten the calipers 18 in threaded engagement with the backing plates 48 and the vertical steel mounting plate 12. The calipers 18 are thereby held rigid relative to the vertical mounting plate 12, and are also immobilized relative to the vehicle frame.

The housing 24 is connected to the vehicle frame by a mounting bracket 51. From the rear of the housing 24, a connecting tube 53 extends terminating in a flange 54. The flange 54 extends inward from the irregular shaped housing 24 and is connected by bolts 56 to the bracket 51 as illustrated in FIG. 1. As depicted in FIG. 2, the irregular shaped housing 24 also includes a laterally extending tubular sleeve 58, which terminates in a circular flange ring 60 and which accomodates movement of the ram 20 therewithin. The flange ring 60, in turn, is fastened to a mating flange ring 62 at the left hand extremity of the hydraulic cylinder 10 depicted in FIG. 1. The flange rings 60 and 62 are securely fastened by bolts 56 which is periodically spaced about the perimeter thereof.

On the face of the irregular shaped housing 24, depicted in FIG. 2, is a flat cover 64 which is fastened by bolts 66 to the remaining portion of the housing 24, which is cast as a single unit. A horizontally disposed disk-shaped bearing mount 68 is similarly bolted to the lower surface of the housing 24 to receive the lower extremity of the worm shaft 28.

As previously noted, it has been found highly desirable for a pressure variation compensation device to be provided for use with the parking brake of the invention. As indicated in FIGS. 3, 4 and 5, such a pressure variation compensator 104 is located within the housing 24. The compensator 104 includes crank arms 106 and 108, rotatively coupled together about a transverse shaft 110 as illustrated in FIG. 5. The transverse shaft 110 is seated in a concave bearing mount 112 in the face plate 64 and in another bearing mount (not shown) on the reverse side of the irregular shaped housing 24. The crank arm 106 is shaped generally as a bellcrank and includes a rearwardly extending arm that is bent to reach approximately to a point abreast of the center of the traveler block 30. The movement arm includes a rearwardly extending U-shaped follower which terminates in a pair of dove tailed catches 118, as depicted in FIGS. 3 and 4. The dove tail catches 118 entrap the latch pins 142 which extend transversely outward on either side of the traveler block 30. At the opposite end of the lever arm connection of the crank arm 106, the moment arm turns inwardly in a transverse flange 120. The forward edge of the flange 120 is forced rearwardly by an engaging hook 122 of a coiled torsion spring 124 co-axially mounted about the transverse shaft 110, which bears against a bearing plate 123 welded to the flange 120, as depicted in FIG. 5. The opposite engaging hook 126 of the torsion spring 124 bears upon another bearing plate 127 welded to a transverse flange 128 of the crank arm 108, which extends toward the flange 120 of crank arm 106. The hook 126 thereby forces the crank arm 108 forward in a rotational direction opposite that of the crank arm 106. A push pin 130 extends rearwardly, as viewed in FIG. 3, from the crank arm 108 and passes through an eye of a ring 132 which has a forwardly extending internally bored shank that terminates in an engaging nut 134, which is visible in FIG. 5. The nut 134 is in threaded engagement with the ram 20 and may be used to ensure a full stroke of the ram 20 into the cylinder 10. The nut 134 may be moved along the threaded portion of the ram 20 to either increase or decrease the length of the ram 20. The flanges 120 and 128 overlap, as is evident in FIG. 5, and are connected together by a preloading pin 129. During installation of the compensator 104, force is exerted to preload the torsion spring 124, until an aperture in the flange 128 is aligned just to the rear of flange 120. The preloading pin 129 is then inserted into the aperture in flange 128 and bears against the back edge of the flange 120 to preload the torsion spring 124.

The spring loaded accumulator 104 interposed between the electric motor 26 and the ram 20 compensates for variation in hydraulic pressure within the parking brake cylinder 10. The torsion spring 124 of the pressure accumulator 104 forces the crank arms 106 and 108 in opposition to each other with a relatively constant force to variable positions of relative disposition with respect to each other, depending upon the hydraulic pressure in the brake cylinder 10. Thus, if the parking brake is initially engaged when the calipers or brake disk 14 are warm, or when the hydraulic fluid within the cylinder 10 and hydraulic lines 76 and 80 are warm, and thereafter the brake parts and hydraulic fluid cool, the pressure accumulator 104 will compensate for the pressure drop, which will result from thermal contraction, by forcing the crank arm 108 forward, as viewed in FIG. 4, to maintain an adequate pressure within the hydraulic cylinder 10. This ensures that the parking brake of the invention remains locked and that the pressure clamping the brake pads within the calipers 18 against the brake disk 14 is not significantly reduced.

In the operation of the invention, when the beverage truck or other vehicle, upon which the brake system of the drawings is installed, is brought to a stop, the electric switch 36 may be moved to the ON position. This completes an electrical circuit providing power to the motor 26. The armature of the motor 26 rotates the worm shaft 28 to carry the traveler block 30 upward from the disengagement position depicted in FIG. 3 to the raised engagement position depicted in FIG. 4. The upward movement of the traveler block 30 carries the rearwardly extending moment arm of the crank arm 106 upward also in clockwise rotation as viewed in FIG. 4. The force from the torsion spring 124 acts between the engaging hooks 122 and 126 to likewise force the crank arm 108 clockwise, thereby driving the ram 20 into the hydraulic cylinder 10 to increase hydraulic pressure therewithin. The traveler block 30 ceases its upward movement when it trips the knife 150 of the upper limit switch 32. This opens the circuit from the vehicle power source to the electric motor 26, thereby terminating motor operation. In this position, the worm of the shaft 28 is engaged with the traveler block 130 in a locked position. Minor expansions or contractions of the hydraulic fluid of the brake cylinder 10 and brake lines 76 and 90 are compensated for by the pressure accumulator 104. Thus, adequate hydraulic pressure is maintained within the hydraulic cylinder 10, although the torsion spring 124 may cause the crank arms 106 and 108 to undergo minor rotational shifts relative to each other.

To release the parking brake of the invention, the toggle switch 36 is merely flicked in the opposite direction. This completes a circuit in which the polarity of leads to the motor 26 is reversed to cause the armature of the motor 26 to rotate in the opposite direction. As a result, the traveler block 30 is carried downward along the worm shaft 28 until it reaches its lowermost position depicted in FIGS. 3 and 6. Once arriving at this position, it trips the knife 152 of the lowerlimit switch 34 to break the electrical connection to the motor 26. In this position, the crank arms 106 and 108 are drawn in counterclockwise rotation, as viewed in FIG. 3, and the ram 20 is withdrawn from the hydraulic cylinder 10. This releases pressure within the hydraulic cylinder 10 so that the brake pads of the calipers 18 are no longer forced against the brake disk 14. The vehicle is then free to travel until the parking brake is once again actuated.

In one suitable embodiment of the invention, the disk 14 is 13 inches in diameter and the calipers 18 are designed to displace 0.28 cubic inches of hydraulic fluid each and are designed to exert 24,000 inch pounds of energy through fourteen square inches of contact area with the disk 14. The master cylinder 10 has a three quarter inch bore and displays 0.60 cubic inches of fluid. Such a system produces a pressure of 500 to 600 pounds per square inch in the brake cylinder, which completely immobilizes the disk 14.

It should be understood that various modifications and alterations of the invention will become readily apparent to those familiar with parking brakes. For example, some parking brakes use but a single caliper, while other parking brakes rely upon the opposing movement of two brake shoes outward against the interior surface of a brake drum connected to a rotatable element. Also, in some parking brake systems only a single caliper 18 may be employed instead of the two calipers depicted in FIG. 2. Furthermore, the irregular shaped housing 24 and the brake cylinder 10 need not necessarily be attached to the vertical mounting plate 12. Rather, depending upon the configuration of the vehicle in which they are installed, these elements of the parking brake system may be attached directly to a structural channel or other framework members of the vehicle. Also, the toggle switch 36 can be modified for interconnection with the vehicle ignition switch. In such an arrangement, withdrawal of the key from the ignition switch will activate rotation of the motor 26 to engage the parking brake. Reinsertion and turning of the key will then automatically disengage the parking brake system, so that the parking brake functions automatically. Accordingly, the invention should not be limited to the particular embodiment depicted in the drawings, but rather is defined by the scope of the claims appended hereto.

I claim:

1. An electric parking brake mechanism for a vehicle equipped with manual operating controls, a hydraulic parking brake system, and an electrical power producing system, comprising:
   a ram for exerting pressure on hydraulic fluid in said hydraulic parking brake system,
   an electric motor with a power connection from said vehicle power producing system converted to reversibly drive said ram,
   limit switches for defining a range of operation of said motor,
   actuating switch means located in the vicinity of said manual operating controls for initiating movement of said electric motor to alternatively propel said ram in opposite directions, and
   pressure variation compensation means including crank arms rotatably coupled together, one crank arm being mechanically linked to said electric motor and the other crank arm being mechanically linked to said ram, and torsion spring biasing means mounted between said crank arms to exert a predetermined force in opposition on said crank arms, thereby causing said crank arms to move together despite changes in resistance to movement of either of said crank arms.

2. An electric parking brake mechanism according to claim 1, further comprising a worm shaft driven by said electric motor, a traveler block longitudinally movable along said worm shaft and linked to reciprocate said ram, whereby movement of said traveler block along said worm shaft activates said limit switches to disengage said electric motor at extreme opposite positions of movement of said traveler block along said worm shaft corresponding to said opposing positions of movement of said ram.

3. A parking brake for a vehicle employing an electrical power producing system and a hydraulic brake system including a hydraulic brake cylinder comprising:
   a housing immobilized with respect to the vehicle frame and coupled to a said brake cylinder,
   a ram positioned for reciprocal movement relative to said brake cylinder to alternatively increase and decrease hydraulic pressure in said cylinder,
   an electric motor electrically connected to said electrical power producing system and mechanically linked to drive said ram in alternative directions of movement,
   limit switches associated with said motor to break the electrical connection therefrom to said electrical power producing system upon rotation of said motor to limits in opposite directions of rotation,
   an actuating switch for initially completing connection of said electric motor to said electrical power producing system to initiate actuation of said electric motor for rotation in a selected direction, and
   a spring loaded accumulator interposed between said electric motor and said ram to compensate for variations in hydraulic volume within said parking brake cylinder.

4. A parking brake according to claim 3 further characterized in that said electric motor is a d.c. motor and said actuating switch is a single pole double throw switch.

5. A parking brake according to claim 3, further characterized in that said accumulator includes opposing crank arms rotatably coupled together on an axis perpendicular to the direction of reciprocation of said ram, and spring biasing means forcing said crank arms apart in opposition to each other with a constant force to variable positions of relative disposition depending upon hydraulic pressure in said brake cylinder.

6. A parking brake according to claim 3, further characterized in that said hydraulic parking brake system includes a disk rotatably coupled to a drive line of the vehicle, and caliper means for selectively immobilizing said disk upon engagement of said parking brake.

7. A parking brake according to claim 6, further characterized in that a brake fluid line leads from said brake cylinder to a junction block, and separate calipers are located on opposite sides of said disk and are connected to said junction block for tandem operation.

* * * * *